United States Patent [19]

Inoue et al.

[11] Patent Number: 4,750,099
[45] Date of Patent: Jun. 7, 1988

[54] CIRCUIT FOR CHARGING CAPACITORS

[75] Inventors: Yuichi Inoue; Shuji Ohtawa; Hitoshi Ochiai; Yoshihiko Kiyono; Chiaki Nakamura, all of Tokyo, Japan

[73] Assignee: Seiko Instruments Inc., Tokyo, Japan

[21] Appl. No.: 18,609

[22] Filed: Feb. 25, 1987

[30] Foreign Application Priority Data

Mar. 10, 1986 [JP] Japan ................................ 61-51659

[51] Int. Cl.$^4$ ............................................. H02M 3/06
[52] U.S. Cl. .......................................... 363/62; 320/1; 323/906
[58] Field of Search .................. 363/62; 368/204, 205; 307/46, 109, 110; 323/906; 320/1

[56] References Cited

U.S. PATENT DOCUMENTS

| | | |
|---|---|---|
| 3,240,958 | 3/1966 | Kerios et al. ........................ 307/110 |
| 3,802,178 | 4/1974 | Tsuruishi ........................ 368/205 X |
| 3,943,428 | 3/1976 | Whidden ............................ 320/1 X |
| 4,404,624 | 9/1983 | Yamazaki ........................ 368/204 X |
| 4,433,282 | 2/1984 | Squires ............................ 368/204 X |
| 4,634,953 | 1/1987 | Shoji et al. ...................... 368/205 X |

Primary Examiner—Patrick R. Salce
Assistant Examiner—Marc S. Hoff
Attorney, Agent, or Firm—Bruce L. Adams; Van C. Wilks

[57] ABSTRACT

A circuit for charging capacitors having a power source, a plurality of capacitors for accumulating an electric charge from the power source, switching elements with electrically controllable inputs for connecting or disconnecting at least one of the capacitors to or from the power source, and resistors for setting the switching elements to turn off. These resistors are connected to the control inputs of the switching elements and to one of two terminals of the power source directly so that the resistors consume the electric charge only when the power source supplies the electric charge.

18 Claims, 4 Drawing Sheets

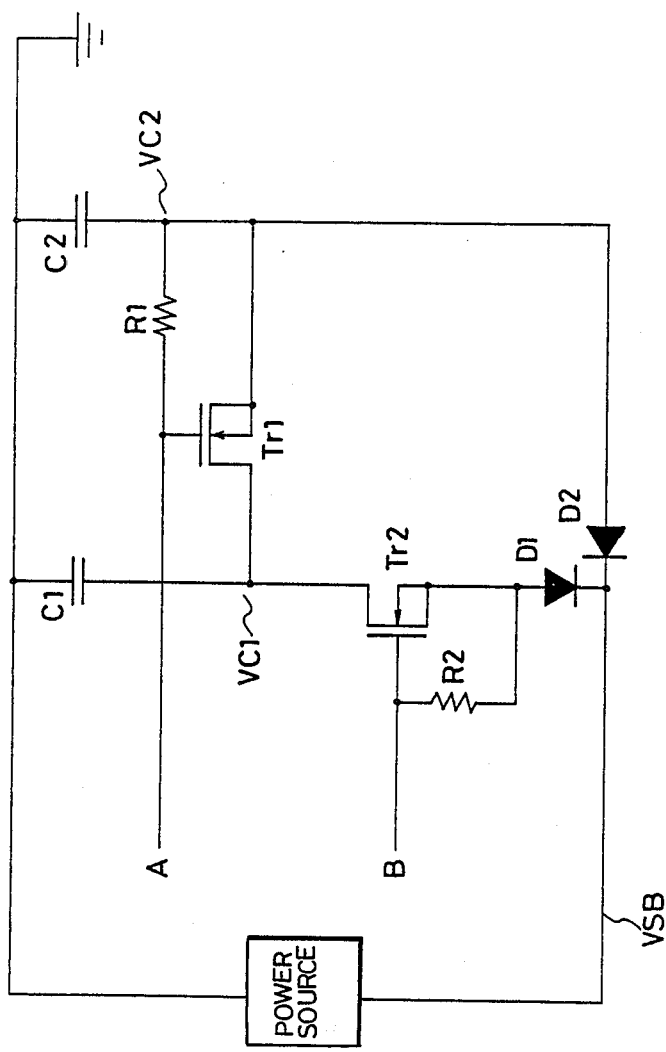
PRIOR ART FIG. 2

CIRCUIT FOR CHARGING CAPACITORS

BACKGROUND OF THE INVENTION

1. Field of the Invention

The present invention relates to a circuit for switching the capacitors in a circuit for charging capacitors of an electronic device which is powered by the electric charge produced by solar cells and stored in the capacitors, without having a battery.

2. Description of the Prior Art

FIG. 2 illustrates a conventional capacitor switching circuit. A first resistor R1 and a second resistor R2 are connected to anodes of a first diode D1 and a second diode D2, respectively.

The structure and operation of the capacitor switching circuit will now be described in conjunction with FIGS. 3A, 3B and 3C. The capacitor switching circuit without having the battery is used for an electronic timepiece which has not a battery but a capacitor C1 having a large capacitance, a capacitor C2 having a small capacitance, and a power source or a power source terminal. Hereinafter, the capacitor C1 having the large capacitance is simply referred to as C1, and the capacitor C2 having the small capacitance is simply referred to as C2. Switching elements Tr1 and Tr2 shown in FIGS. 3A, 3B and 3C correspond to the switching elements Tr1 and Tr2 of FIG. 2, and are turned on or off or made conductive or non-conductive by logic or control signals A and B from a logic or control circuit. The power source consists of solar cells, a manually operated generator or an external power source. In the following description, the power source is presumed to be solar cells for easy explanation.

The capacitor switching circuit operates so that the switching elements Tr1 and Tr2 are turned off when the solar cells are irradiated with light and produce an electric charge current that is generated under the condition where the voltages of C1 and C2 are low and the electronic device is not operating. Namely, the current is permitted to flow into C2 only to quickly raise or build up its output voltage, so that the logic circuit is instantly powered and operated and the electronic device exhibits carries out its function. This operation is hereinafter referred to as "quick start" "or build-up", and FIG. 3A represents the condition of quick start. When the output voltage of C2 is still low at the time of quick start and the logic circuit is not operating, the logic signals A and B are not yet stabilized to control the switching elements Tr1 and Tr2. Therefore, the resistors R1 and R2 are connected to the gates or input terminal of the switching elements Tr1 and Tr2 as illustrated in FIG. 2, so that the switching elements are completely turned off.

As the logic circuit detects the fact that the output voltage of C2 is sufficiently raised in excess of a predetermined voltage, the switching element Tr2 is turned on by the logic signal B, whereby the current from the solar cells flows into C1 to electrically charge C1. Hereinafter, this condition is referred to as "C1 charging condition". FIG. 3B represents the C1 charging condition. Under the C1 charging condition, the current from the solar cells flow almost all into C1, and very little current flows into C2. During this time, the logic circuit is supplied with the output voltage of C2. Therefore, the voltage of C2 decreases gradually. As the logic circuit detects that the voltage of C2 beomes lower than a given value, the switching element Tr2 is turned off by the logic signal B, and the quick start condition is assumed. As the quick start condition is assumed, C2 is quickly charged by the solar cells and the C1 charging condition is resumed. Thus the quick start condition represented by FIG. 3A and the C1 charging condition represented by FIG. 3B are alternatingly repeated, so that the voltage of C1 rises gradually.

As the logic circuit detects the fact that the voltage of C1 is raised to a value sufficient for operating the logic circuit, both the switching elements Tr1 and Tr2 are turned on by the logic signals A and B. The condition in which both the switching elements Tr1 and Tr2 are turned on is referred to as "C1 charge completion condition" which is represented by FIG. 3C.

Under the quick start condition and the C1 charging condition, the voltage of C2 drops quickly if the solar cells are no more irradiated with light, and the timepiece ceases operation. Under the C1 charge completion condition, however, the current is supplied from C1 to the logic circuit, and the timepiece continues to work for several days.

In the conventional capacitor switching circuit, however, the electric current flows into the resistors R1 and R2 under the C1 charge completion condition. Since the current is supplied from the capacitors C1 and C2, duration of the timepiece is shortened accordingly.

SUMMARY OF THE INVENTION

It is an object of the present invention to provide a circuit for charging capacitors by which the electric charge current is consumed in reduced amounts.

According to the present invention in which the resistors R1 and R2 are connected to the second terminal (VSB) of the power source as shown in FIG. 1, the electric current is not supplied to the resistors R1 and R2 from the capacitors C1 and C2 under the C1 charge completion condition. Under the quick start condition, furthermore, the function is sufficiently carried out in that the current is supplied from the power source to the resistors R1 and R2 to turn off the switching elements Tr1 and Tr2.

BRIEF DESCRIPTION OF THE DRAWINGS

FIG. 2 shows a conventional capacitor switching circuit;

DETAILED DESCRIPTION OF THE PREFERRED EMBODIMENT

An embodiment of the present invention will be described hereinafter with reference to the accompanying drawings.

Figure 1:
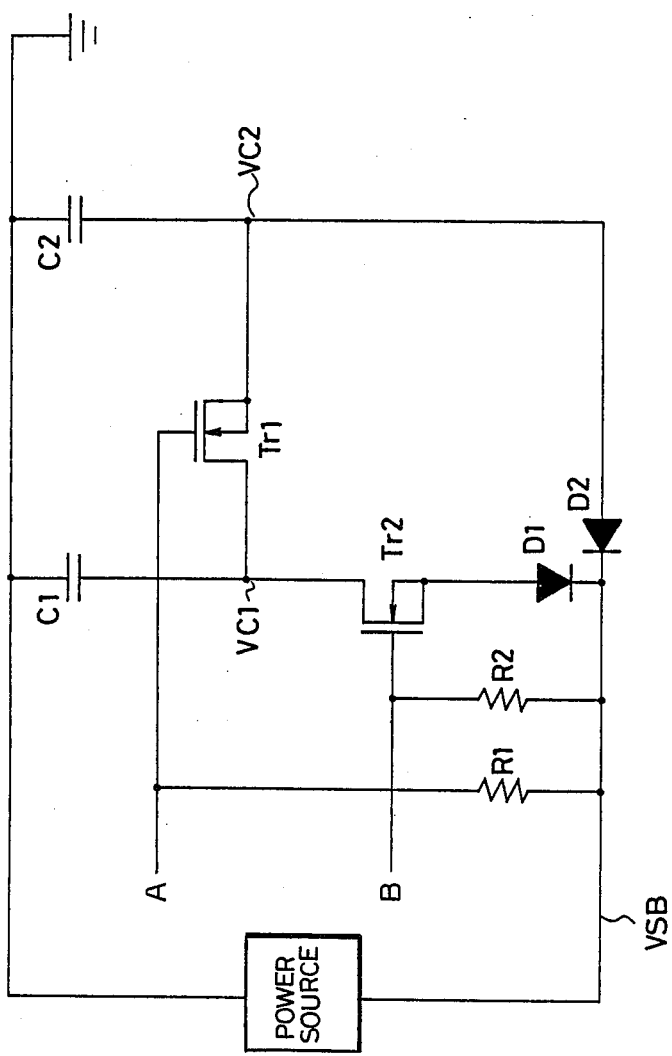
FIG. 1 shows a capacitor switching circuit according to the present invention.
Figure 4:
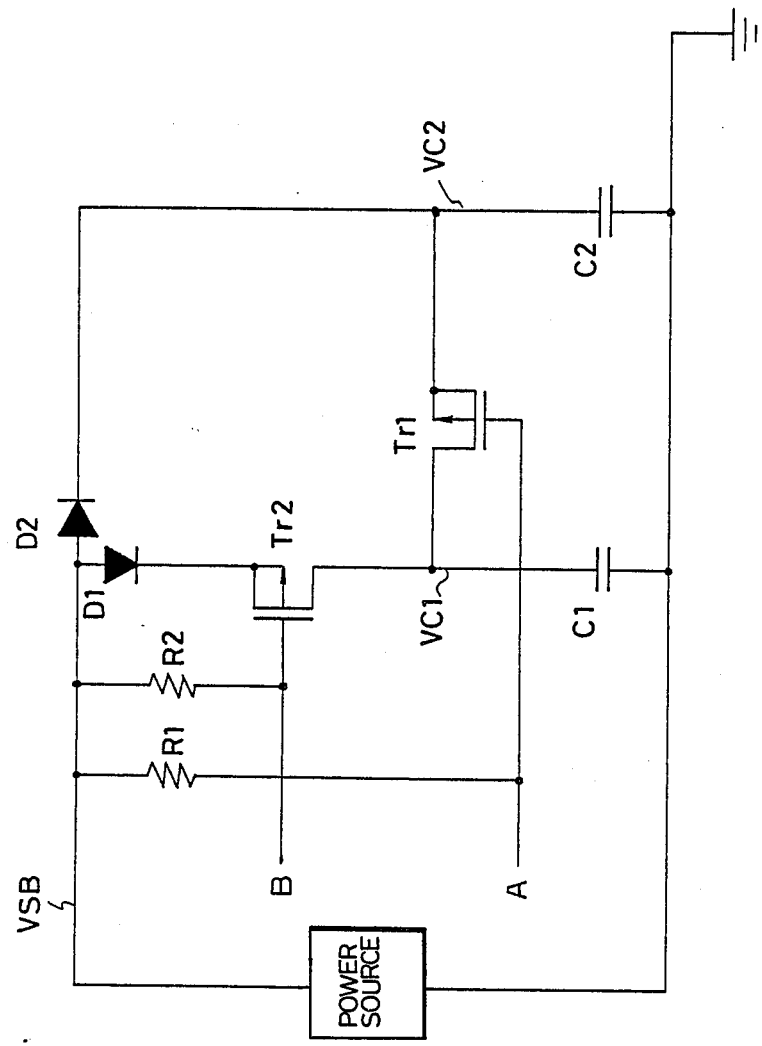
FIG. 4 shows another embodiment of the capacitor switching circuit according to the present invention.

FIG. 1 illustrates an embodiment according to the present invention wherein a first terminal of the power source is grounded. FIG. 4 illustrates another embodiment where a second terminal of the power source is grounded. In FIG. 4, the ground level of the power source are simply reversed, and the functions and effects are quite the same as those of the FIG. 1 embodiment.

Figure 3B:
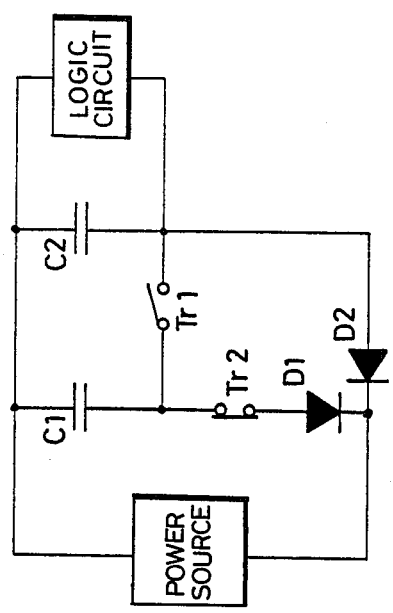
FIGS. 3A, 3B and 3C are diagrams illustrating the operation of the capacitor switching circuit.
Figure 3A:
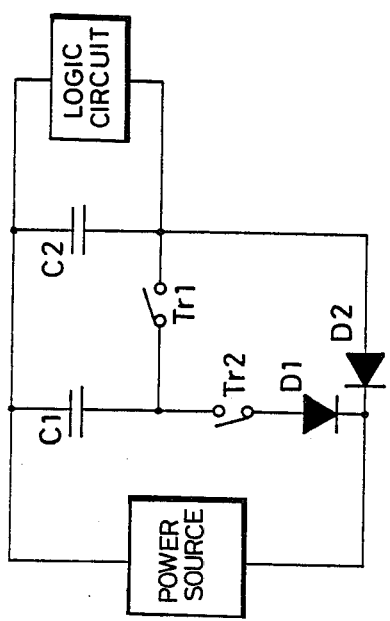
Figure 3C:
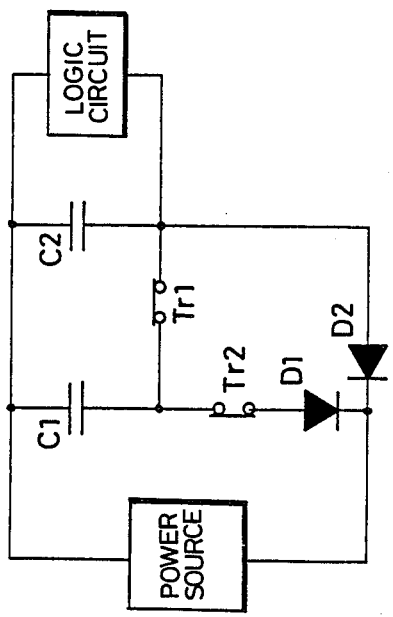

The capacitor switching circuit according to the present invention operates quite in the same manner as the conventional capacitor switching circuit that is described in the foregoing "Description of the Prior Art" in conjunction with FIG. 3.

Electric currents amount supplied from the capacitors C1 and C2 to the resistors R1 and R2 in the conventional capacitor switching circuit will be compared with the currents amount in the capacitor switching circuit of the present invention.

(In the conventional case)

In FIG. 2, if voltages of the capacitors C1 and C2 are denoted by VC1 and VC2, and if the resistance of the switching element TR2 under the conductive state is denoted by RTr2, the electric currents I1 and I2 that flow into the resistors R1 and R2 under the C1 charge completion condition are given by, $$I1 = \frac{VC2}{R1}$$

$$I2 = \frac{VC1}{R1 + RTr2}$$

(In the case of the invention)

In FIG. 1, the electric current is not supplied from the capacitors C1 and C2 to the resistors R1 and R2, but is supplied from the power source to the resistors R1 and R2, since the resistors R1 and R2 are connected directly to one terminal of the power source. If the forward voltage drops of the diodes D1 and D2 are denoted by VD1 and VD2, respectively, the current is supplied from the power source to the capacitors C1 and C2 when the voltage VSB of the power source becomes greater than VC1+VD1, VC2+VD2. In this case, the current flowing into the capacitors C1 and C2 decreases by a current that flows into the resistors R1 and R2. Therefore, the current flowing into the resistors R1 and R2 corresponds to the current supplied from the capacitors C1 and C2 in the conventional case. In the embodiment of the present invention, therefore, though the currents are not supplied from the capacitors C1 and C2 to the resistors R1 and R2, the electric charge supplied from the power source to the capacitors C1 and C2 are decreased by the resistors R1 and R2. Here, the amounts of reduction are:

$$I1 = K \times \frac{VC2 + VD2}{R1}$$

$$I2 = K \times \frac{VC1 + VD1}{R1 + RTr2}$$

Where, parameter K denotes a rate of time in which the power source generates electric charge. Namely, when the power source consists of solar cells, the time in which the solar cells are irradiated with light is from about 8 to 16 hours a day. Therefore, K=⅓ to ⅔. Further, when the power source consists of a manually operated generator, about 3 to 6 minutes are assigned to operate the generator a day. In this case, therefore, K=1/480 to 1/240.

Next, the currents I1 and I2 will be calculated by introducing typical numeric values of the capacitor voltages VC1 and VC2, the forward voltages VD1 and VD2 of diodes, the resistors R1 and R2, the resistance RTr2 of switching element Tr2 under the conductive state, and the time rate K.

VC1=VC2=2.0 [V]
VD1=VD2=0.6 [V]
R1=R2=10 [megohm]
RTr2=1 [kiloohm]
K=½ (in the case of solar cells)
K=1/320 (in the case of a manually operated generator)

(In the conventional case)

I1+I2=0.40 [uA]

(In the case of the invention)

When solar cells are used;
I1+I2=0.26 [uA]
When the manually operated generator is used;
I1+I2=0.0016 [uA]

In this example, it is shown that the total current I1+I2 flowing through the resistors R1 and R2 is equal to 65% of the conventional case when solar cells are used, and is equal to 0.41% of the conventional case when the manually operated generator is used.

According to the present invention as described above, the resistors R1 and R2 consume a current in reduced amounts, and the duration is extended in the electronic device operated by the capacitors which is charged by solar cells or a manually operated generator.

What is claimed is:

1. A circuit for charging capacitors comprising: power supplying means having two terminals for supplying electric charge; at least two capacitor means (C1, C2) for accumulating the electric charge from said power supplying means; switching means (Tr2) having an electrically controllable input for connecting or disconnecting at least one of said two capacitor means to or from said power supplying means; and resistor means (R2) for setting said switching means (Tr2) to turn off, said resistor means being connected to said input of said switching means (Tr2) and directly to one of said two terminals (VSB) of said power supplying means so that said resistor means (R2) consumes the electric charge only when said power supplying means supplies the electric charge.

2. A circuit for charging capacitors as claimed in claim 1 further comprising second switching means (Tr1) having an electrically controllable input for connecting or disconnecting said two capacitor means (C1, C2) to or from each other, and second resistor means (R1) for setting said second switching means (Tr1) to turn off, said second resistor means being connected to said input of said second switching means (Tr1) and directly to one of said two terminals (VSB) of said power supplying means so that said second resistor means (R1) consumes the electric charge only when said power supplying means supplies the electric charge.

3. A circuit for charging capacitors as claimed in claim 2; wherein said power supplying means comprises a solar cell.

4. A circuit for charging capacitors as claimed in claim 2; wherein said power supplying means comprises a manually operated generator.

5. A circuit for charging capacitors as claimed in claim 2; wherein said two switching means (Tr1, Tr2) comprise MOSFETS.

6. A circuit for charging capacitors as claimed in claim 2; further comprising logic circuit means for applying control signals (A, B) to said two switching means (Tr1, Tr2) the logic circuit means being energized by said two capacitors (C1, C2).

7. A circuit for charging capacitors as claimed in claim 1; wherein said power supplying means comprises a solar cell.

8. A circuit for charging capacitors as claimed in claim 1; wherein said power supplying means comprises a manually operated generator.

9. A circuit for charging capacitors as claimed in claim 1; wherein said switching means (Tr2) comprises a MOSFET.

10. A circuit for charging capacitors as claimed in claim 1; further comprising logic circuit means for applying a control signal (B) to said switching means the logic circuit means being energized by said two capacitors (C1, C2).

11. A power supply apparatus comprising: a power source having a pair of terminals for intermittently supplying electric charge; first capacitive means connected to the power source and having a relatively small capacitance for receiving the electric charge to quickly build up an output voltage in the first capacitive means; second capacitive means selectively connected to the power source and having a relatively large capacitance for storing therein the electric charge; switching means connected between the second capacitive means and the power source and having an input terminal for switching between a conductive state and a non-conductive state in response to a control voltage applied to the input terminal; and resistive means having a given resistance and a pair of terminals, one of the terminals being connected to the input terminal of the switching means to apply thereto a control voltage effective to maintain the switching means non-conductive to thereby disconnect the second capacitive means from the power source until the first capacitive means quickly builds up the output voltage, and the other terminal being connected directly to one of the power source terminals so that the resistive means consumes the electric charge only when the power supply supplies the electric charge.

12. A power supply apparatus according to claim 11; including control means connected to the input terminal of the switching means for applying thereto a control signal effective to render the switching means conductive to connect the second capacitive means to the power source after the output voltage exceeds a predetermined voltage so that the second capacitive means is charged to store the electric charge supplied from the power source.

13. A power supply apparatus according to claim 12; wherein the control means includes means for applying another control signal to the input terminal of the switching means effective to render the switching means non-conductive to disconnect the second capacitive means from the power source when the output voltage falls below a predetermined value during the charging of the second capacitive means.

14. A power supply apparatus according to claim 12; including additional switching means connected between the first and second capacitive means and having an input terminal for switching between a conductive state and a non-conductive state in response to a control voltage applied to the input terminal.

15. A power supply apparatus according to claim 14; including additional resistive means having a given resistance and a pair of terminals, one of the terminals being connected to the input terminal of the additional switching means to apply thereto a control voltage effective to maintain the additional switching means non-conductive so that the first capacitive means is disconnected from the second capacitive means to effect the quick build-up of the output voltage in the first capacitive means, and the other terminal being connected directly to one of the power source terminals so that the additional resistive means consumes the electric charge only when the power supply supplies the electric charge.

16. A power supply apparatus according to claim 15; wherein the control means includes means connected to the input terminal of the additional switching means for applying thereto a control signal effective to render the additional switching means conductive to connect the first capacitive means to the second capacitive means after the voltage across the second capacitive means exceeds a predetermined value.

17. A power supply apparatus according to claim 11; wherein the power source comprises a solar cell.

18. A power supply apparatus according to claim 11; wherein the power source comprises a manually operated generator.

* * * * *